United States Patent [19]

Tanaka

[11] Patent Number: 5,012,905
[45] Date of Patent: May 7, 1991

[54] DOUBLE WRAP BRAKE BAND AND ITS MANUFACTURING METHOD

[75] Inventor: Teruhiko Tanaka, Neyagawa, Japan

[73] Assignee: Kabushiki Kaisha Daikin Seisakusho, Osaka, Japan

[21] Appl. No.: 402,411

[22] Filed: Sep. 5, 1989

[30] Foreign Application Priority Data

Sep. 12, 1988 [JP] Japan .............................. 63-227680

[51] Int. Cl.⁵ .............................................. F16D 65/06
[52] U.S. Cl. .............................. 188/250 H; 188/77 W; 188/259; 192/81 R; 192/107 T
[58] Field of Search .............. 188/249, 250 H, 259, 188/77 R, 77 W; 192/80, 81 R, 107 T

[56] References Cited

U.S. PATENT DOCUMENTS

| 1,378,459 | 5/1921 | Hons, Jr. ........................ 188/249 |
| 1,456,606 | 5/1923 | Konigslow, Sr. ............. 188/77 R |
| 4,602,706 | 7/1986 | Blinks et al. ................. 192/107 TX |
| 4,757,880 | 7/1988 | Grzesiak ...................... 188/259 X |

FOREIGN PATENT DOCUMENTS

| 1248883 | 1/1989 | Japan ............................ 188/77 W |
| 1248884 | 1/1989 | Japan ............................ 188/77 W |
| 1348352 | 3/1974 | United Kingdom ............ 188/77 R |

Primary Examiner—George E. A. Halvosa
Attorney, Agent, or Firm—Armstrong, Nikaido, Marmelstein Kubovcik & Murray

[57] ABSTRACT

A double wrap brake band having three bands, friction facings fastened to each band and a connecting member connecting the outside bands of the three bands with the intermediate band of such bands. A first bracket member secured to both outside bands, and a second bracket member secured to the intermediate band. The three bands, the connecting member, and the first and second bracket members are made of sheet metal, respectively. Edges, receiving a piston, or an anchor, at their backsides, are integrally formed on the first and second bracket members, respectively. The connecting member and the first and second bracket members are secured to the three bands by rivets. The second bracket member is provided with wing-shaped reinforcing members which stretch integrally from both sides of a portion secured to the intermediate band at the backside of the edge toward a lateral direction of the both outside bands to cover the both outside bands, and extends integrally in a circumferential direction to both front side portions of the edge.

8 Claims, 7 Drawing Sheets

DOUBLE WRAP BRAKE BAND AND ITS MANUFACTURING METHOD

BACKGROUND OF THE INVENTION

1. Field of the Invention

This invention relates to a double wrap brake band and its manufacturing method for use in an automatic transmission for an automobile.

2. Description of the Related Art

Generally, a construction shown by 200 in FIG. 17 and FIG. 18, for example, has been known as a double wrap brake band for use in an automatic transmission (U.S. Pat. No. 2,867,898). In this structure, the brake band 200 is disposed on an outer peripheral part of a drum 202 concentric with a drive shaft 201 extending from a torque converter not shown.

The double wrap brake band 200 is provided with three bands 210, 211 and 212 formed approximately into annular shape, friction facings 213, 214 and 215 fastened to the inner peripheral surfaces of the bands 210, 211 and 212. A connecting member 216 connecting one circumferential ends of the both outside bands 210 and 212 with another circumferential end of the intermediate band 211. A first bracket member 217 secured to the other circumferential ends of the both outside bands 210 and 212. A second bracket member 218 secured to one circumferential end of the intermediate band 211. Incidentally, in this structure, the first bracket member 217 has an edge for receiving a piston 219 and the second bracket member 218 has an edge for receiving an anchor pin 220, respectively.

However, in the structure shown in FIG. 17 and FIG. 18, the connecting member 216 and the first and second bracket members 217 and 218 are all made of the forging segments which are welded to the thick metal straps and then formed into prescribed shapes by broaching, so that internal stresses are produced during manufacturing to cause occurrence of drags between the completed bands 210, 211 and 212 and a drum 202.

In order to solve the above-mentioned troubles, a structure and its manufacturing method wherein the connecting member and the first and second bracket members are integrally made of sheet metal and welded to straps made of sheet metal have been proposed in U.S. Pat. No. 4,602,706 and have been disclosed in Japan (Japanese Patent Publication No. 58-68523).

However, this structure is apt to distort by heat during manufacturing because the connecting member and the first and the second bracket members are welded to the bands. Further, even the narrow second bracket member, which is secured to the intermediate band, is made of the thin sheet metal, so that sufficient strength is not obtainable.

Furthermore, because this structure includes the process in which the connecting member and the first and second bracket members are manufactured from the unit segment, it is difficult to change thicknesses and materials of respective components.

An object of this invention is to solve the above-mentioned troubles.

SUMMARY OF THE INVENTION

In order to solve the above-mentioned troubles, this invention provides a double wrap brake band including three bands formed into approximately annular shape, friction facings fastened to inner peripheral surfaces of respective bands, a connecting member connecting circumferential one ends of the both outside bands with a circumferential other end of the intermediate band, a first bracket member secured to a circumferential other ends of the both outside bands, and a second bracket member secured to a circumferential one end of the intermediate band; characterized by that the three bands, the connecting member, and the first and second bracket members are separately made of sheet metal, an edge receiving a piston or an anchor at backsides is integrally formed on the first and second bracket members respectively, the connecting member and the first and second bracket members are secured to corresponding places of the three bands by means of rivets respectively, and the second bracket member is provided with wing-shaped reinforcing members which stretch integrally from both sides of a portion secured to the intermediate band at the backside of the edge toward a lateral direction of the both outside bands to cover the both outside bands, and extend integrally in a circumferential direction to the both front side portions of the edge.

Further, this invention also provides a manufacturing method of double wrap brake band which includes a process for forming a strap made of sheet metal into annular shape, provided with rivet holes for securing the two bracket members and slit groups in parallel two rows extending intermittently in a longitudinal direction; a process for forming a strap-like friction facing, of which the strap is formed into approximately circle by means of heat treatment and the strap-like friction facing previously provided with slit groups in two rows extending intermittently in the longitudinal direction is fastened to the inner peripheral surface of the strap; a process for forming three bands by aligning the slit groups on the strap to which the friction facing is fastened; a process for forming a connecting member connecting circumferential one end portions which become the both outside bands of the strap with a circumferential other end portion which becomes the intermediate band, a first bracket member secured to circumferential other end portions which become the both outside bands, and a second bracket member secured to a circumferential one end portion which becomes the intermediate band, made of sheel metal respectively; and a process for securing the connecting member and the first and second bracket members to respective corresponding places of the strap by using rivets; the process for forming the first and second bracket members including a process for forming an edge which receives a piston or an anchor pin at their backsides by bending approximately middle portions thereof; and the process for forming the second bracket member including a process for forming wing-shaped reinforcing members which stretch integrally from both sides of a portion secured to the intermediate band at the backside of the edge toward a lateral direction of the both outside bands to cover the both outside bands, and extend integrally in a circumferential direction to the both front side portions of the edge.

DESCRIPTION OF THE PREFERRED EMBODIMENTS

Figure 1:
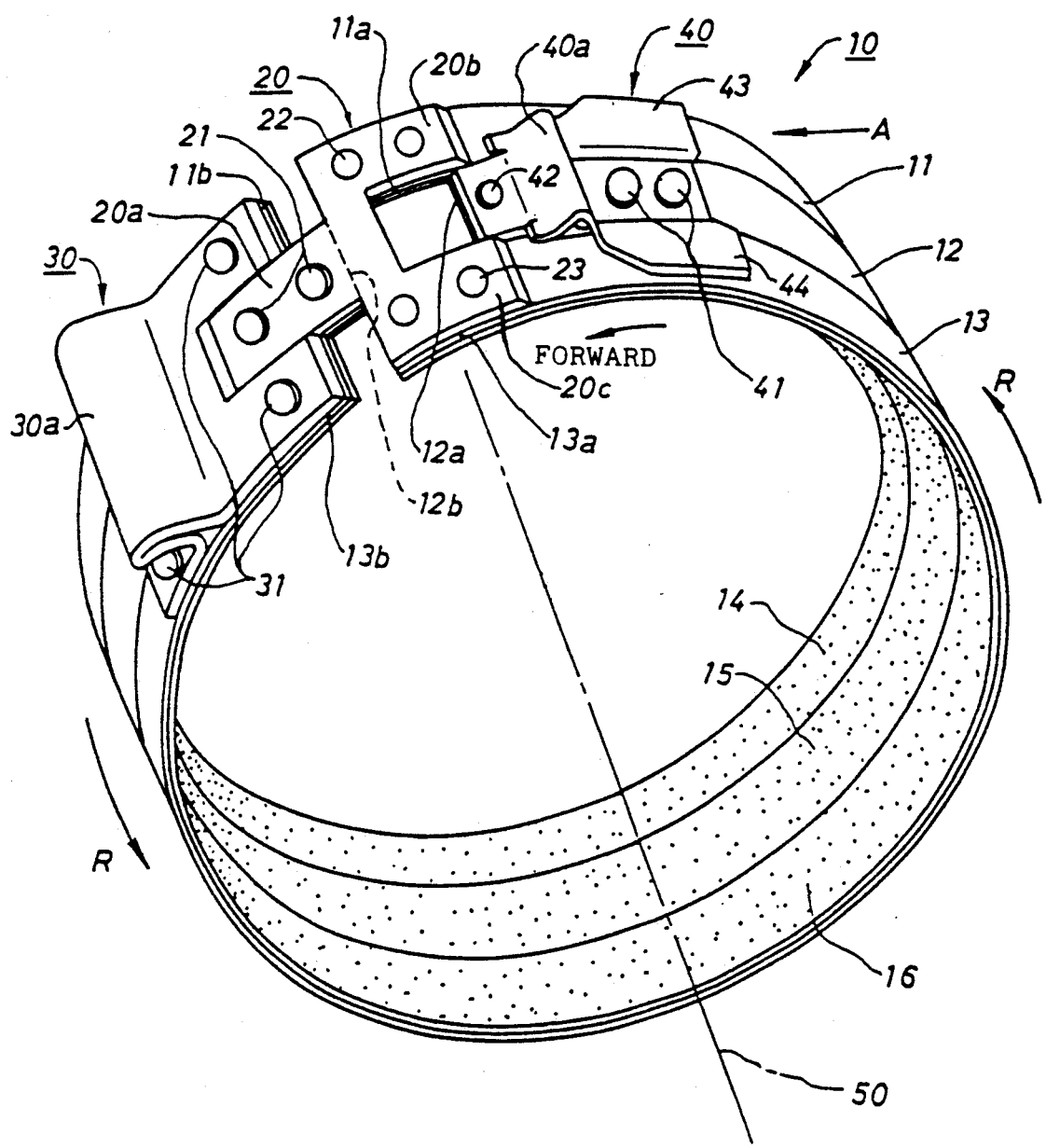
FIG. 1 is an oblique view of the double wrap brake band according to this invention.

As illustrated in FIG. 1, a double wrap brake band 10 according to the present invention includes three bands 11, 12 and 13 formed into a C-shape. The outside bands 11 and 13 are disposed in a manner that circumferential one ends 11a and 13a are aligned flush with each other in circumferential other ends 11b and 13b, and an intermediate band 12 is disposed in a position that its one end 12a fits between the both outside bands 11 and 13 goes in a circumferential direction and its other end 12b projects from the both outside bands 11 and 13 by that amount in the circumferential direction. The bands 11, 12 and 13 are made of the thin sheet metal having an uniform thickness. Although widths of the outside bands 11 and 13 are substantially same, the width of the intermediate band 12 is a little larger than those of the outside bands 11 and 13.

Friction facings 14, 15 and 16 are integrally fastened to the inner peripheral surfaces of the bands 11, 12 and 13, respectively.

20 is a connecting member having an approximately Y-shaped, in which forked connecting portions 20b and 20c extend integrally from a connecting portion 20a in parallel with each other, and at the same time, extend in opposite direction to the connecting portion 20a. The other end 12b of the intermediate band 12 is secured to an internal face of the connecting portion 20a of the connecting member 20 by caulking rivets 21, and one ends 11a and 13a of the both outside bands 11 and 13 are secured to internal faces of the connecting portions 20b and 20c by caulking rivets 22 and 23. The connecting member 20 is also made of sheet metal. When the connecting member 20 is made of the sheet metal having larger flexibility than that of first and second bracket members 30 and 40 described later, the bands 11, 12 and 13 can hold a drum 50 (only its center line is shown) more uniformly and effectively preventing improper fastening or drag. Because the connecting member 20 in the present invention is formed separately from the first and second bracket members 30 and 40 which will be described later, it becomes possible to modify material and shape on one member only (for instance, the connecting member 20 only) at discretion.

Figure 8:
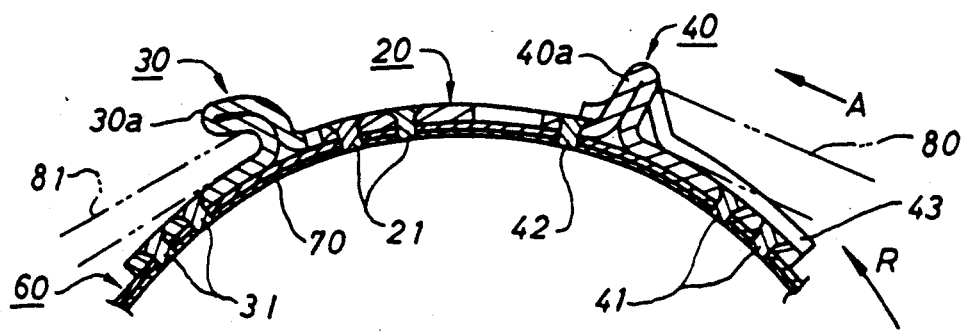
FIG. 8 is a sectional view taken along line VIII-—VIII of FIG. 6.

The first bracket member 30 is secured to the other ends 11b and 13b of the both outside bands 11 and 13 by caulking rivets 31. The first bracket member 30 is formed by a process, in which sheet metal is punched into approximately H-shaped and its middle portion is bent upward to integrally configure an edge 30a for receiving an anchor pin 81 (FIG. 8).

The second bracket member 40 is secured to an upper part of the one end 12a of the intermediate band 12. The bracket member 40 is also bent upward at a part slightly deviated from its middle portion to the connecting member 20 side so as to form an edge 40a for receiving a piston 80 (FIG. 8). Assuming that the connecting member 20 side of the bracket member 40 is a front side, a rear side of the edge 40a is secured to the intermediate band 12 by caulking two rivets 41 arranged in the circumferential direction of the intermediate band 12, and a front side of the edge 40a is secured to the one end 12a of the intermediate band 12 by caulking a rivet 42. As illustrated by the figure, the bracket member 40 is provided with wing-shaped reinforcing members 43 and 44 which stretch integrally from both sides of a portion secured to the intermediate band 12 at the backside of the edge 40a toward a lateral direction of the both outside bands 11 and 13 to cover upper portions of the both outside bands 11 and 13 with some clearance. These reinforcing members 43 and 44 are stretched and curved in the circumferential direction along with the annular bands 11, 12 and 13, and their tip ends are formed integrally on the front side of the edge 40a which is bent upward. Because the reinforcing members 43 and 44 increase a strength in the circumferential direction of the edge 40a, a sufficient durability can be obtained even when the thin sheet metal is applied for the material of the second bracket 40. Further, because the reinforcing members 43 and 44, which are formed into wing shape, are so stretched in the lateral direction of the both outside bands 11 and 13 as to cover upper portions of the both outside bands 11 and 13 with clearance, they can also provide a non-skid function for the piston 80 (FIG. 8).

When the first and second bracket members 30 and 40 are fabricated, they are formed into so suitable annular shape as to fit on outer peripheral surfaces of the bands 11, 12 and 13.

Manufacturing method of the present invention will be described hereunder.

Figure 2:
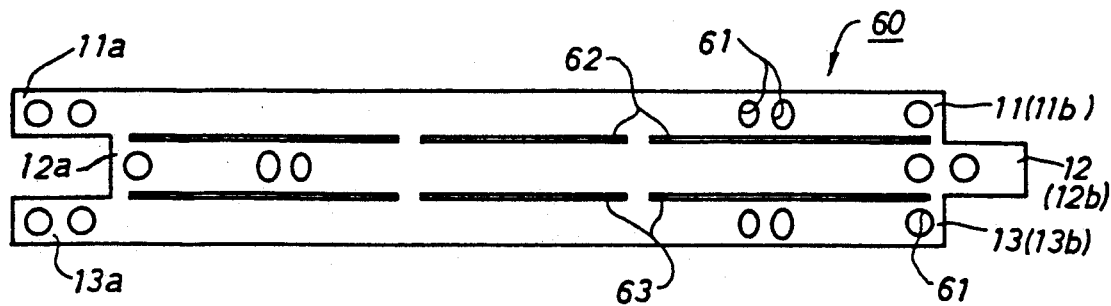
FIG. 2 is a plan view of a strap to which this invention is applicable.

The bands 11, 12 and 13 as described in FIG. 1 are made from a strap 60 illustrated in FIG. 2. The strap 60 is formed by punching the sheet metal in a press work, for example. In the embodiment of FIG. 2, portions which become the one ends 11a and 13a of the both outside bands 11 and 13 project slightly from a portion which becomes the intermediate band 12, so that a portion which becomes the other end 12b of the intermediate band 12 projects slightly from portions which become the outside bands 11 and 13 by that amount.

Rivet holes 61 and slits 62 and 63 are formed in the strap 60 by punching the sheet metal simultaneously.

The rivet holes 61 are holes for securing the first and second bracket members 30 and 40 (FIG. 1). The simultaneous formation of the rivet holes 61 permits an easy positioning for attaching the first and second bracket members 30 and 40 without special gauge or jig.

The slits 62 and 63 (slit groups) extend intermittently in parallel two rows, and the strap 60 is divided into three pieces to form the three bands 11, 12 and 13 (FIG. 1) by joining the slits 62 and 63 in their longitudinal direction respectively in a process described later. Incidentally, if the slits 62 and 63 are formed in such a manner that both end portions which become the bands 11, 12 and 13 are joined each other in their lateral direction, a forming work described later will become easy.

Figure 3:
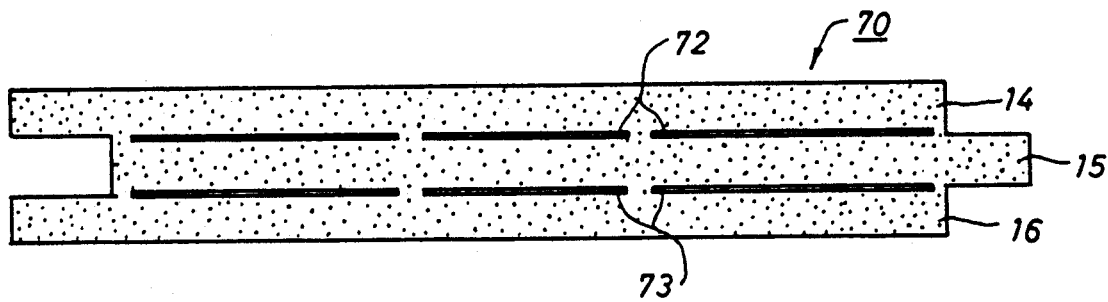
FIG. 3 is a plan view of a friction material to which this invention is applicable.

FIG. 3 shows a friction material having the same dimension and configuration as the strap 60 of FIG. 2. However, holes corresponding to the rivet holes 61 of FIG. 2 are not formed in the friction material 70. Slits 72 and 73 arranged in parallel two rows (slit group) are also formed in the friction material 70 in the same way as the strap 60 of FIG. 2. Three friction facings 14, 15 and 16 (FIG. 1) can be formed by joining these slits 72 and 73 in their longitudinal direction.

Figure 4:
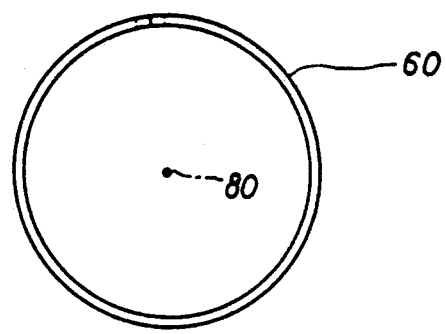
FIG. 4 is a schematic side view of a strap showing a forming process of the strap according to this invention.

FIG. 4 shows a process for forming the strap 60 of FIG. 2 into annular shape by winding it around a core metal 80 (only its axis is shown).

Figure 5:
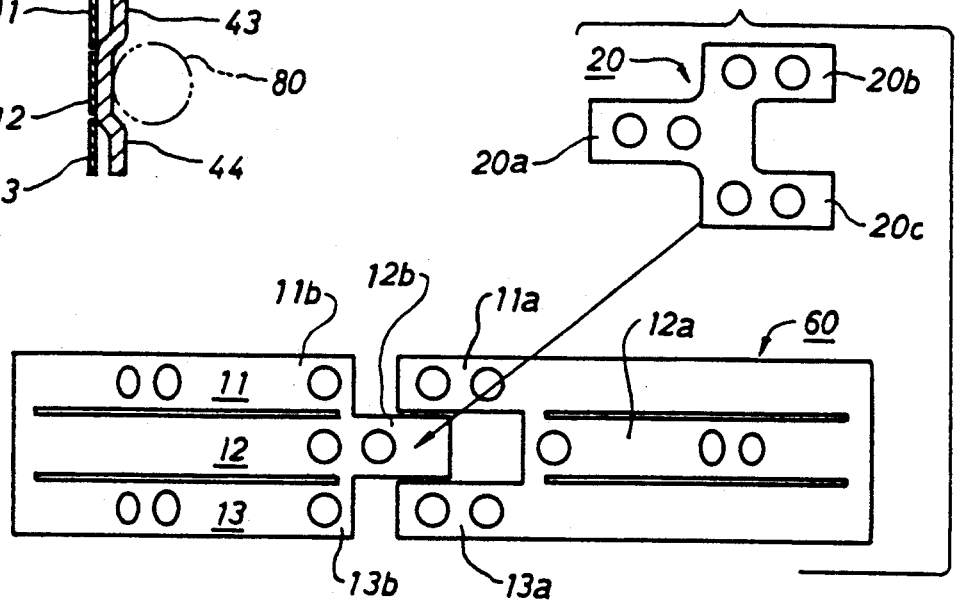
FIG. 5 is a plan view showing a connecting process of the strap according to this invention.

The strap 60 is formed into the annular shape in the process of FIG. 4 as illustrated in FIG. 5. In this process, the portion corresponding to the other end 12b of the intermediate band 12 goes in between the portions corresponding to the one ends 11a and 13a of the outside bands 11 and 13. The portion corresponding to the one end 12a of the intermediate band 12 is spaced small clearance in the circumferential direction apart from the portion corresponding to the other end 12b.

The connecting member 20 illustrated in an upper part of FIG. 5 is then secured by caulking the rivets 21, 22 and 23 (FIG. 1) so that the portions which become the one ends 11a and 13a of the outside bands 11 and 13 of the strap 60 and the portion which becomes the other end 12b of the intermediate band 12 of the strap 60 are connected with each other.

Figure 7:
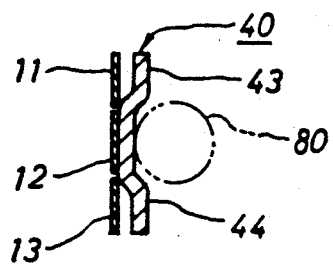
FIG. 7 is a sectional view taken along line VII—VII of FIG. 6.
Figure 6:
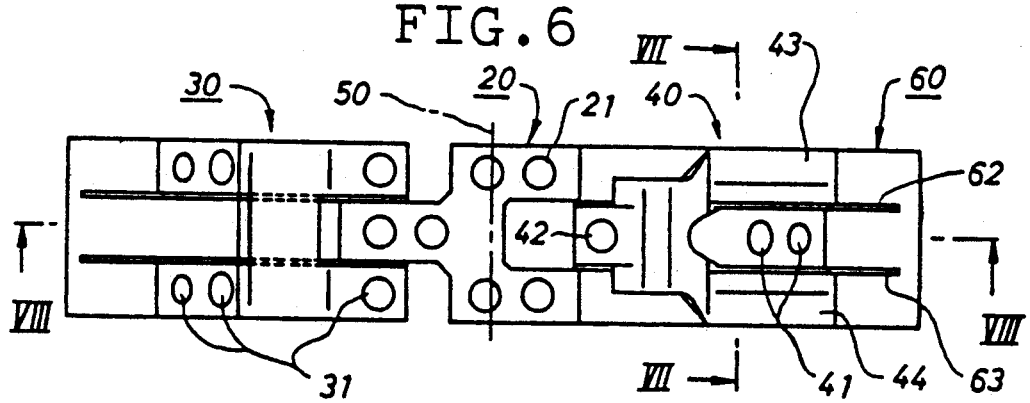
FIG. 6 is a plan view of the strap showing a bracket member securing process according to this invention and a heat treatment process.

As illustrated in FIG. 6 and FIG. 7, the first and second bracket members 30 and 40 which are made of sheet metal and are preformed by the press work are secured by caulking rivets 31, 41 and 42 to the strap 60, which has been connected by the connecting member 20 and has been formed into annular shape, respectively. After the connecting process of the first and second bracket members 30 and 40, a heat treatment of the assembly consisting of the strap 60, connecting member and first and second bracket members 30 and 40 is carried out to form the assembly into the perfect circle fitting onto the drum 50 (only its center line is shown in FIG. 6). Incidentally, because the reinforcing members 43 and 44 that have been described in details in FIG. 1 are formed integrally with the second bracket member 40 by the press work as shown by FIG. 7, they reinforce the second bracket member 40 and work as a guide member for the piston 80.

After the heat treatment of the assembly consisting of the strap 60, connecting member 20 and first and second bracket members 30 and 40, the friction material 70 of FIG. 3 is fastened to the inner peripheral surface of the strap 60 as illustrated in FIG. 8. 81 in FIG. 8 is an anchor pin.

Figure 9:
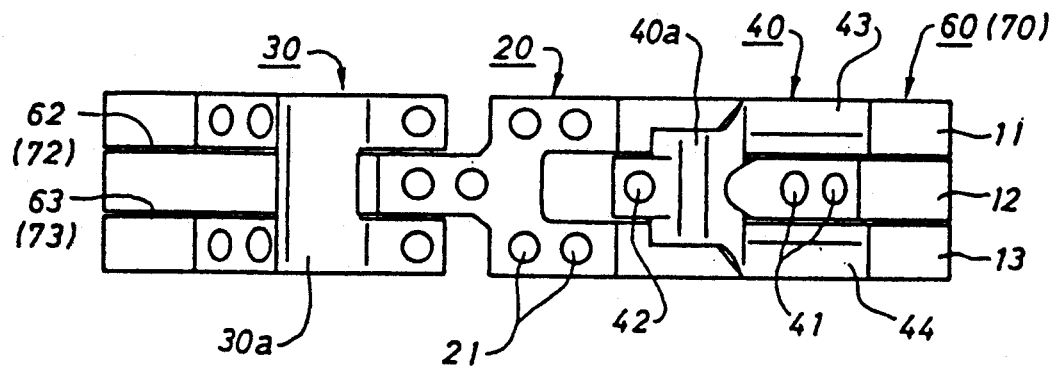
FIG. 9 is a plan view showing a cutting process of the strap according to this invention.

Finally, the slits 62, 63, 72 and 73 (FIG. 2 and FIG. 3) of the strap 60 and friction material 70 are joined together in the circumferential direction by using an appropriate tool such as a cutter, so that the strap 60 and the friction material 70 are divided into separated pieces as illustrated by FIG. 9. Thereby, the double wrap brake band 10 of the present invention shown in FIG. 1 is completed.

Function

When the piston 80 (FIG. 8) pushes the edge 40a of the second bracket member 40 in a direction of arrow A under the condition that the drum 50 is released as shown in FIG. 1, the intermediate band 12 transmits the force in a direction of arrow R through the second bracket member 40. Then, the force of the intermediate band 12 is transmitted through the connecting member 20 to the outside bands 11 and 13, so that the force in the direction of arrow R is transmitted to the first bracket member 30, thereby the first bracket member 30 tends to move in the direction of arrow R. However, because the movement of the first bracket member 30 is prevented by the anchor pin 81 (FIG. 8), each of three bands 11, 12 and 13 tightens the drum 50 uniformly contacting with an outer peripheral surface of the drum 50. Thus, a friction force is produced between the outer peripheral surface of the drum 50 and inner peripheral surfaces of the bands 11, 12 and 13. The rotation of the drum 50 is braked by the friction force.

Although the edge 40a of the second bracket member 40 recieves strong pressing force of the piston 80 (FIG. 8) during the operation the reinforcing members 43 and 44 which are integrally formed at the rear of the edge 40a enable the edge 40a to fully withstand the driving force. Accordingly, the second bracket member 40 does not deform even when the double wrap brake band 10 of the present invention is used under severe operating conditions. Further, there is no possibility that the piston 80 (FIG. 8) slides in the lateral direction of the bands 11, 12 and 13, because the reinforcing members 43 and 44 strech in the lateral direction of the both outside bands 11 and 13 so formed into the wing shape as to cover the upper portions of the both outside bands 11 and 13 with clearance. If the connecting member 20 is made of the sheet metal having large flexibility, the bands 11, 12 and 13 fit onto the outer peripheral surface of the drum 50 preventing the improper fastening, and stabilizing a friction coefficient therebetween.

Although the first bracket member 30 is set up for the anchor pin 81 and the second bracket member 40 is set up for the piston 80 according to the above embodiment, it is possible to apply the first bracket member 30 for the piston 80 and to apply the second bracket member 40 for the anchor pin 81.

According to the present invention as described above; the three bands 11, 12 and 13, the connecting member 20 and the first and second bracket members 30 and 40 are made of sheet metal, so that it becomes possible to obtain cheap products and to reduce the weight of the products as compared with conventional members which made of spring metal for example.

Further, the connecting member 20 and the first and second bracket members 30 and 40 are secured to the corresponding places of the three bands 11, 12 and 13 by the rivets 21, 22, 23, 31, 41 and 42, so that the present invention provides the structure easy positioning the members without a special gauge or jig to secure the members. Consequently, efficiency of assembly operations can be raised. Reliability can be improved as compared with the welding work, and there is no fear of occurrence of residual strain as frequently encountered in the welding work. Therefore, the present invention enables to provide products with less drag and stable friction coefficient.

Moreover, the second bracket member 40 secured to the intermediate band 12 of the present invention is provided with the wing-shaped reinforcing members 43 and 44 which stretch integrally from both sides of the portion secured to the intermediate band 12 at the backside of the edge 40a toward the lateral direction of the both outside bands 11 and 13 to cover them, and extend integrally in a circumferential direction. Therefore, the bracket member 40 is stronger than conventional one. Particularly, sufficient durability can be obtained even if the thin sheet metal is applied for the narrow second bracket member 40 secured to the intermediate band 12. Accordingly, the bracket member 40 does not deform even if the double wrap brake band 10 is used under severe operating conditions.

Furthermore, because the manufacturing method of the present invention includes the process for forming the connecting member 20 and the first and second bracket members 30 and 40 separately with each other, the voluntary modification of material and shape etc. on only one member (for example, the connecting member 20) becomes possible. Therefore, for example when only the connecting member 20 is made of the highly flexible sheet metal as the embodiment described in FIG. 1 through FIG. 9, it becomes possible to make the bands 11, 12 and 13 fit onto the outer peripheral surface of the drum 50 preventing improper fastening, and stabilizing the friction coefficient therebetween.

In the embodiment illustrated in FIG. 10 through FIG. 16, structure and manufacturing method for modified shapes of the connecting member 20, the strap 60 and the friction material 70 described in FIG. 1 through FIG. 9 are disclosed.

Figure 10:
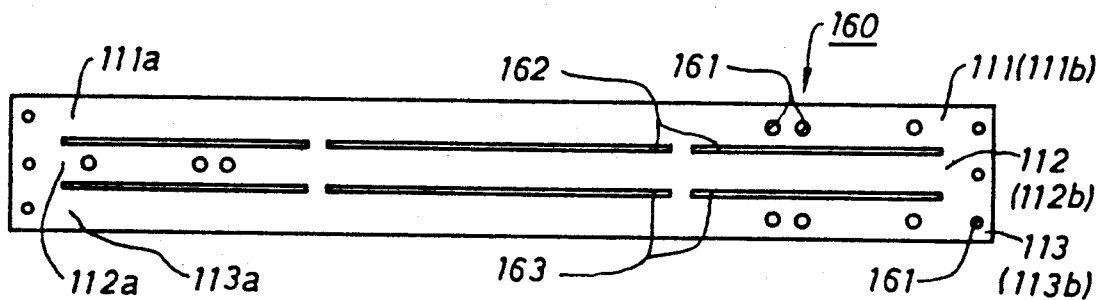
FIG. 10 is a plan view of an another strap to which this invention is applicable.

As shown in FIG. 10, a rectangular strap 160 may be employed in the present invention, in which parts which become the bands 111, 112 and 113 are aligned flush with each other and formed into strap-like shape. The rivet holes 161 and slits 162 and 163 are punched on the strap 160 in the same way as the strap 60 (FIG. 2).

Figure 11:
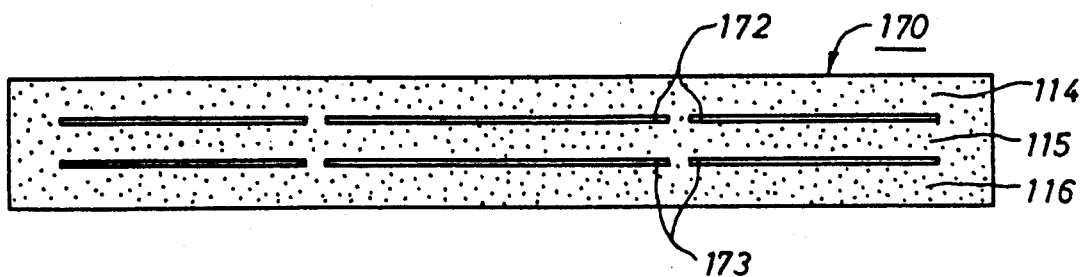
FIG. 11 is a plan view of an another friction material to which this invention is applicable.

A friction material 170 having the same dimension and shape as the strap 160 is shown in FIG. 11 of which slits 172 and 173 are punched in the same way as the friction material 70 of FIG. 3.

Figure 12:
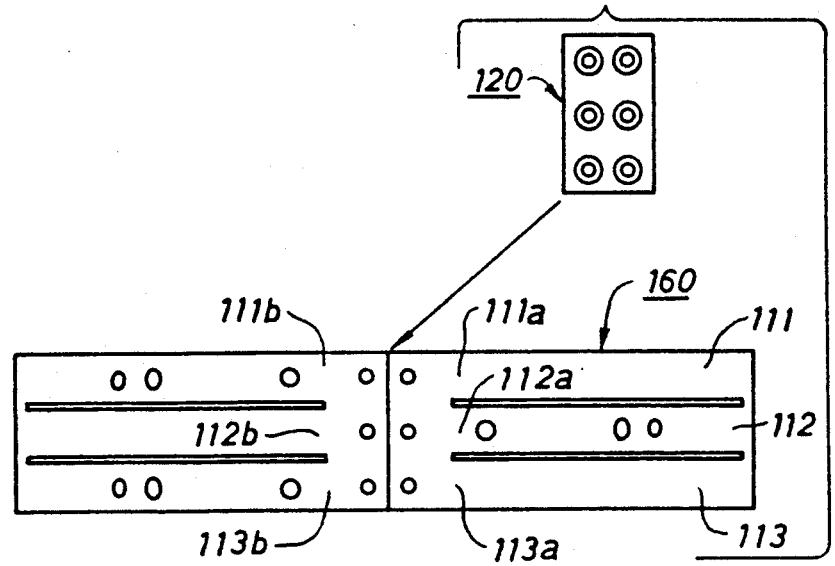
FIG. 12 is a plan view showing a connecting process of the strap of FIG. 10.
Figure 16:
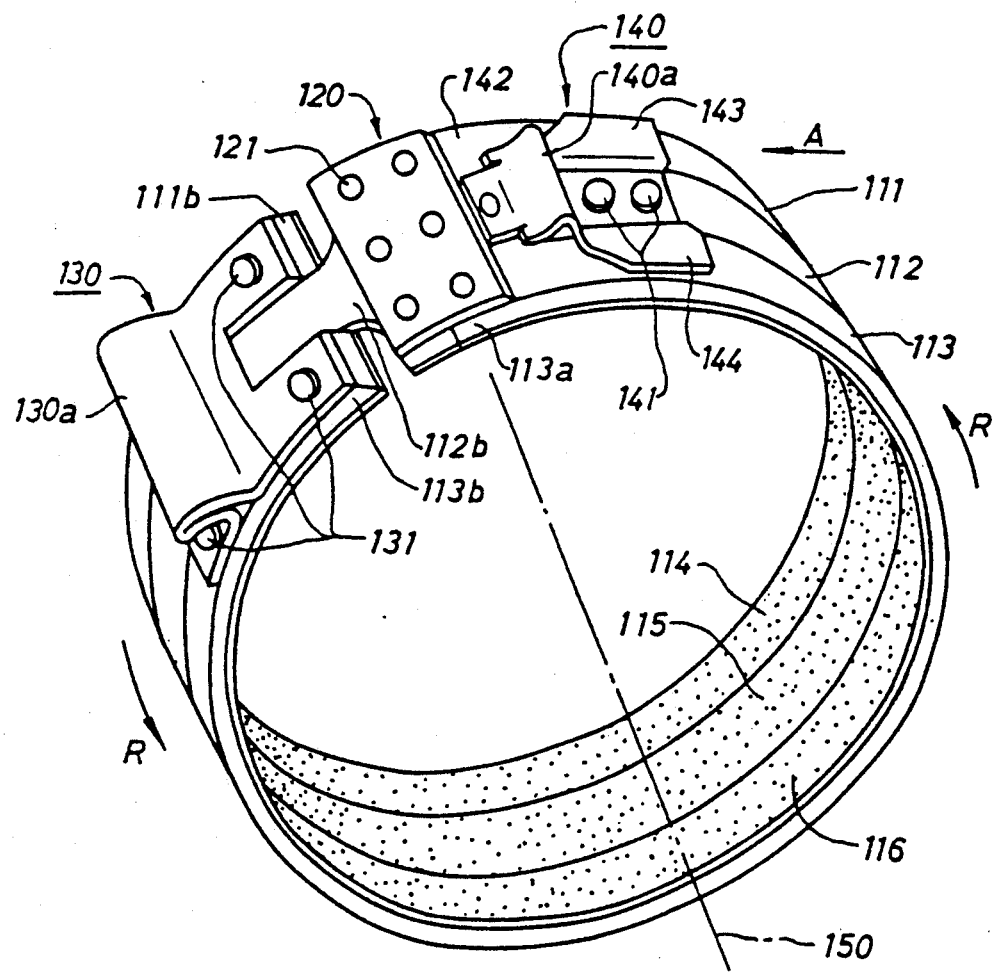
FIG. 16 is an oblique view of a double wrap band completed by the processes that have been described in FIG. 10 through FIG. 15.
Figure 17:
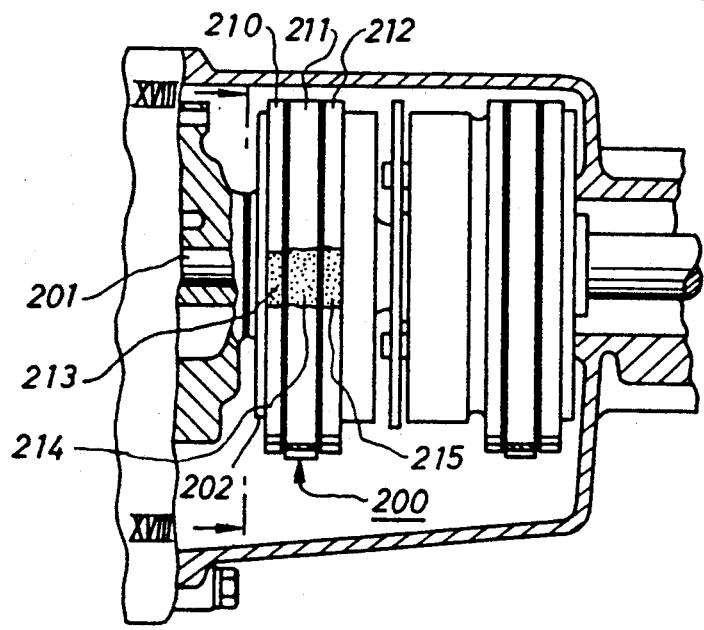
FIG. 17 is a vertical sectional schematic view of a general automatic transmission.
Figure 18:
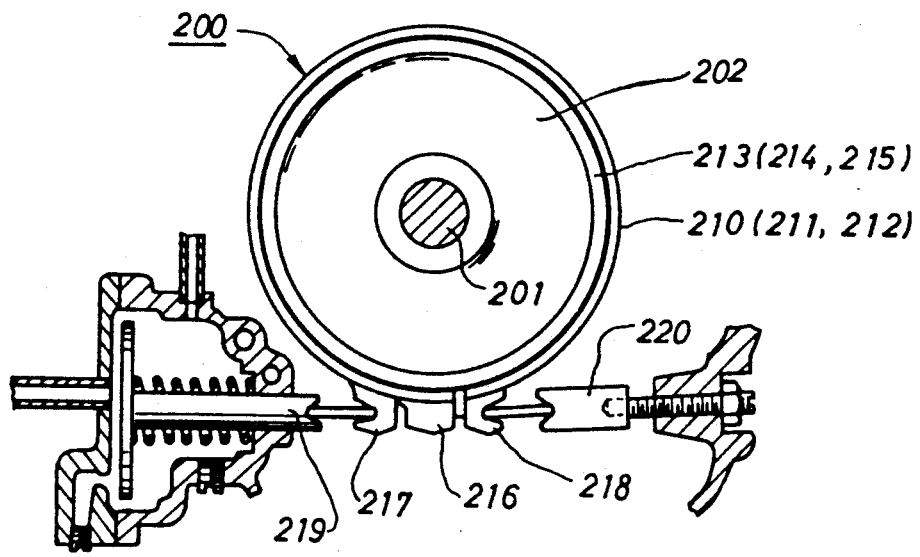
FIG. 18 is a sectional view taken along line XVIII-—XVIII of FIG. 17.

In a process shown in FIG. 12, the strap 160 formed into annular shape by connecting a connecting member 120 by means of rivets 121 (FIG. 16). The strap 160 is so curved that its circumferential both end faces abut on each other. As illustrated by an upper part of FIG. 12, the connecting member 120 is a rectangular member one side of which has the same width of the strap 160, and is longer than the other side. Parts which become one ends 111a, 112a and 113a of the bands 111, 112 and 113 of the strap 160 are respectively connected to parts which become the other ends 111b, 112b and 113b by caulking three pairs of rivets 121 (FIG. 16), lining up in a lateral direction of the strap 160, by which the connecting member 120 is secured.

Figure 13:
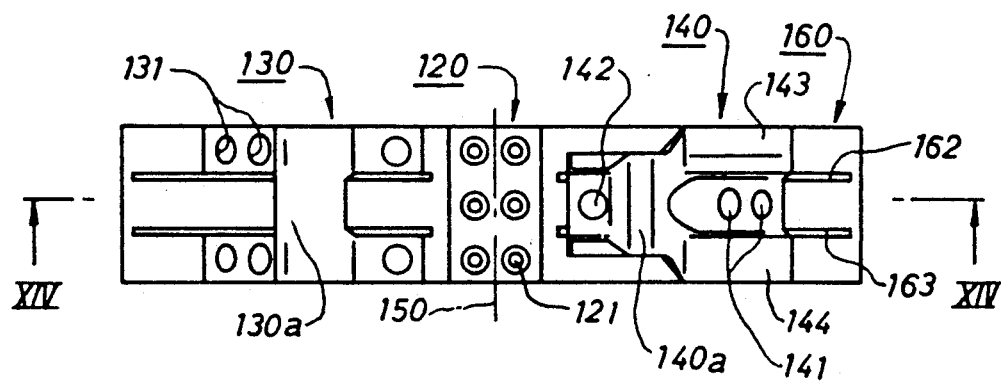
FIG. 13 is a plan view showing a securing process and a heat treatment process of the bracket member according to this invention.

As illustrated in FIG. 13, the first and second bracket members 130 and 140 made of sheet metal and preformed by the press work are respectively secured by rivets 131, 141 and 142 to the strap 160 which has been formed into annular shape by securing the connecting member 120. A heat treatment of an assembly consisting of the strap 160, the connecting member 120 and the first and second bracket members 130 and 140 is carried out to form the assembly into the perfect circle fitting onto the drum 150 (only its center line being shown in FIG. 6). Incidentally, the first and second bracket members 130 and 140 are corresponding to the first and second bracket members 30 and 40 shown in FIG. 1, respectively.

Figure 14:
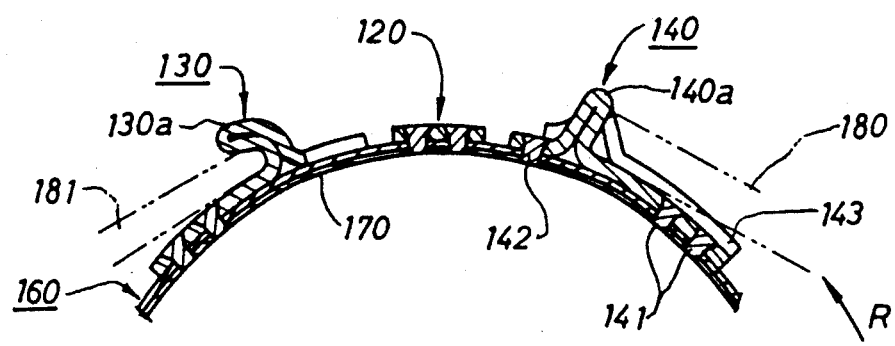
FIG. 14 is a sectional view taken along line XIV—XIV of FIG. 13.

As illustrated in FIG. 14, after the heat treatment of the assembly consisting of the strap 160, the connecting member 120 and the first and second bracket members 130 are 140, a friction material 170 of FIG. 11 is fastened to the inner peripheral surface of the strap 160.

Figure 15:
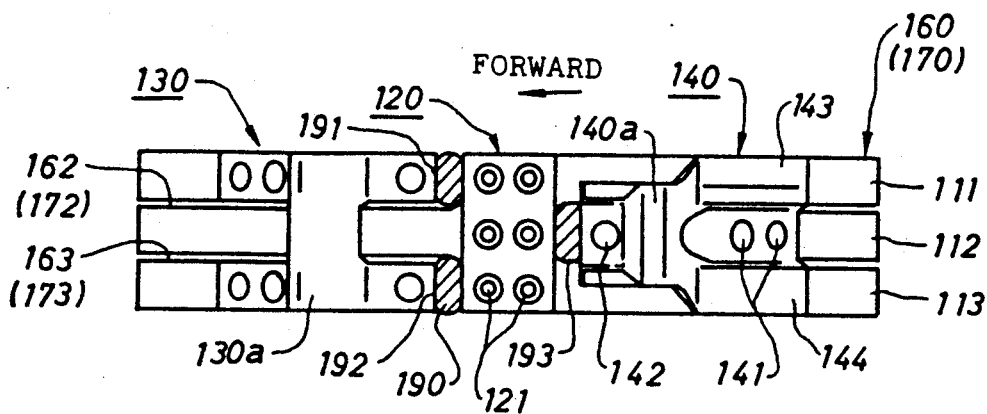
FIG. 15 is a plan view of the strap showing a cutting process of the strap according to this invention.

Then, notches 191, 192 and 193 are formed in the assembly consisting of the strap 160, the connecting member 120 and the first and second bracket members 130 and 140 by using a press 190 for example, as illustrated in FIG. 15. The notches 191, 192 and 193 are notches for dividing the strap 160 to which the friction material 170 is fastened into three pieces. Assuming that a left side of FIG. 15 is a front side, the strap 160 is divided into two outside adjacent portions at the front of the connecting member 120 and a central adjacent portion at the rear of the connecting member 120, for example. The strap 160 to which friction material 170 is fastened is divided in the same way as shown in FIG. 9 by joining their slits 162, 163, 172 and 173 in the circumferential direction, thereby a double wrap brake band 110 shown in FIG. 16 is completed.

What is claimed is:

1. A double wrap brake band including three bands flush with each other and formed into approximately annular shape, side-by-side friction facings fastened to inner peripheral surfaces of the respective bands, each of said bands having circumferentially spaced ends, a connecting member circumferentially connecting one end of said ends of both outside bands of said three bands with a circumferential opposite end of an intermediate band of said three bands, a first bracket member secured to the opposite ends of said both outside bands, and a second bracket member secured to a circumferential one end of said intermediate band; characterized by that said three bands, said connecting member, and said first and second bracket members, respectively, are separately made of sheet metal, an edge for receiving a piston at a backside thereof is integrally formed on one of said first and second bracket members and an edge for receiving an anchor at a backside thereof is integrally formed on the other of said first and second bracket members, said connecting member and said first and second bracket members are, respectively, secured to corresponding places on said three bands by means of rivets and said second bracket member is provided with wing-shaped reinforcing members stretching integrally from opposite sides of a portion of said second bracket member secured to said intermediate band at the backside of said edge and in a lateral direction of said both outside bands to substantially completely cover the total width of said outside bands over an outer peripheral, circumferential portion thereof, said second bracket member extending integrally in a circumferential direction to a front side portion of said edge.

2. A double wrap brake band as set forth in claim 1, in which said bands are made of sheet metal having a uniform thin thickness.

3. A double wrap brake band as set forth in claim 1 or claim 2, in which a width of said intermediate band is slightly larger than said outside band.

4. A double wrap brake band as set forth in any one of claim 1 or 2, in which said connecting member is made of sheet metal having larger flexibility than those of said first and second bracket members.

5. A double wrap brake band as set forth in claim 1, in which said outside bands are disposed in a manner that circumferential one ends are aligned flush with circumferential other ends, said intermediate band is so disposed in a position that one of its ends projects between one of the ends of both side bands a fixed distance in a circumferential direction and its opposite end projects from the opposite of the ends of both outside bands by said fixed distance in the circumferential direction, said connecting member is formed into an approximately Y-shape wherein forked connecting portions extend integrally from one side connecting portion in parallel with each other, and at the same time, extend in the opposite direction to the connecting portion, the opposite end of said intermediate band is secured to an inside face of said one side end of said connecting member, and one ends of said both outside bands are secured to inside faces of said forked connecting portions.

6. A double wrap brake band as set forth in claim 1, in which said three bands are so disposed that circumferential one ends are aligned flush with circumferential other ends, and said connecting member is a rectangular member having two ends, one of said connecting ends has the same width as said intermediate band and is longer than the other end of said connecting member.

7. A double wrap brake band as set forth in claim 1, in which said edge is formed by bending a portion upwardly deviated slightly from a middle part thereof toward the connecting member side.

8. A bracket member made of sheet metal and secured to one end of an intermediate band of double wrap bands having outside bands, characterized by that said bracket member includes an edge formed by bending a portion upwardly and deviated slightly from a middle part thereof toward a tip end side, and wing-shaped reinforcing members extending integrally from both sides of a portion secured to the intermediate band positioned at backsides of said edge toward a lateral direction and extending over both said outside bands to substantially completely cover the total width of said outside bands over an outer peripheral, circumferential portion thereof and extending integrally in a circumferential direction to an end side opposite said tip end side.

* * * * *